United States Patent Office

2,887,465
STABILIZATION OF CHLORINE CONTAINING POLYMERS WITH (EPOXYETHYL) BENZENES

Heinrich Hopff, Kusnacht, Zurich, Switzerland, assignor to J. R. Geigy A.-G., Basel, Switzerland, a Swiss firm No Drawing. Application February 10, 1958
Serial No. 714,079

Claims priority, application Switzerland
February 14, 1957

4 Claims. (Cl. 260—45.8)

On being processed, particularly at higher temperatures, halogen-containing macromolecular compounds such as polyvinyl chloride, polyvinylidene chloride, chlorinated rubber, tend to split off hydrogen halide which leads to discolouration of the products and corrosion of the machines used.

The use of epoxy compounds such as, for example phenoxy propene oxide or glycide ethers of phenols as stabilising agents for such compounds has already been suggested. By this suggestion, liquid substances are meant in which the epoxy group is bound to the aromatic nucleus by way of an oxygen atom.

It has been found that solid polyepoxy compounds containing the epoxy group linked direct to the aromatic nucleus are excellently suitable for the stabilisation of halogen-containing macromolecular compounds, in particular polyvinyl chloride, polyvinylidene chloride, chlorinated rubber and mixed polymers containing vinyl chloride or vinylidene chloride, as well as polychlorinated diphenyls and polychloronaphthalenes. Examples of such polyepoxides are 1.3- or 1.4-di-(epoxyethyl)-benzene or 1.3.5-tri-(epoxyethyl)-benzene of the following formulae:

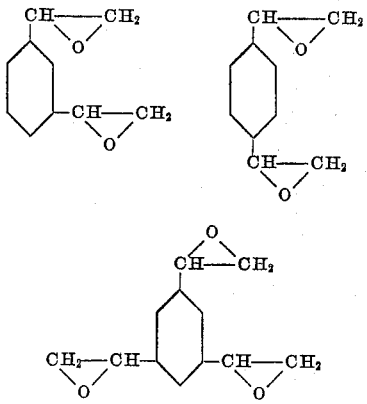

These compounds can be produced according to the process described in Helv. Chim. Acta, vol. XL, p. 274 (1957). The p-di-(epoxyethyl)-benzene (M.P. 79° C.) and 1.3.5-tri-(epoxyethyl)-benzene (M.P. 64° C.) as well as the isomeric forms or mixtures thereof are either mixed with the halogen-containing macromolecular compounds before processing or are incorporated on milling at higher temperatures. The activity of the polyepoxy compounds increases with the number of epoxy groups. The new, heat stable compositions according to the present invention contain 0.1 to about 3% of the stabilisers, which amount is absolutely sufficient to attain a great improvement of the stability to heat of the products. The poly-epoxides mentioned can also be used for the stabilising of solutions of the macromolecular halogen compounds in organic solvents.

In the following examples, some methods of performing the process according to the present invention are given; they do not limit the invention in any way.

Example 1

100 parts of a polymer obtained by emulsion polymerisation of vinyl chloride are mixed in powder form with 0.5 part of 1.3.5-tri-(epoxyethyl)-benzene in a ball mill. On plasticising on a hot roller mill and then pressing, sheets having excellent stability to heat are obtained.

Example 2

A mixed polymer from 85 parts of vinylidene chloride and 15 parts of vinyl chloride, obtained by emulsion polymerisation is mixed with 1 part of 1.3.5-tri-(epoxyethyl)-benzene in a ball mill and then formed into bristles or little bands in an alloy extruder containing no iron. The products obtained are very light coloured and have good stability to heat.

Example 3

A 20% solution of chlorinated rubber which also contains 0.5% of 1.4-di-(epoxyethyl)-benzene in toluene solution (calculated on the chlorinated rubber) is poured into a film. After drying, the film produced has very good stability to heat and weather.

Example 4

100 parts of an emulsion polymer of vinyl chloride are mixed with 2.5 parts of the di-epoxide from technical divinyl benzene, consisting of about 70% of the meta and 30% of the para compound, 30 parts of dioctyl phthalate are added and the whole is rolled on a heated calender into a homogeneous foil. The product so obtained can be made into elastic forms which have excellent stability to heat.

What I claim is:

1. The new heat stable composition of matter consisting essentially of a chlorine containing macromolecular compound selected from the group consisting of polyvinyl chloride, polyvinylidene chloride and chlorinated rubber and of from 0.1 to 3%, calculated on said compound, of a solid stabiliser selected from the group consisting of 1.3-di-(epoxyethyl)-benzene, 1.4-di-(epoxyethyl)-benzene and 1.3.5-tri-(epoxyethyl)-benzene.

2. The new heat stable composition of matter consisting essentially of polyvinyl chloride and of from 0.5 to 1%, calculated on said compound, of 1.3.5-tri-(epoxyethyl)-benzene.

3. The new heat stable composition of matter consisting essentially of polyvinylidene chloride and of from 0.5 to 1%, calculated on said compound, of 1.3.5-tri-(epoxyethyl)-benzene.

4. The new heat stable composition of matter consisting essentially of chlorinated rubber and of from 0.5 to 1%, calculated on said compound, of 1.4-di-(epoxyethyl)-benzene.

References Cited in the file of this patent
UNITED STATES PATENTS
2,595,619    Voorthuis _____ May 6, 1952
OTHER REFERENCES
Everett et al.: Chem. Ab., vol. 45 (1951), p. 6574.